United States Patent
Patel et al.

(10) Patent No.: US 10,444,977 B2
(45) Date of Patent: Oct. 15, 2019

(54) CELLPHONE MANAGER

(71) Applicant: Verizon Patent and Licensing Inc., Basking Ridge, NJ (US)

(72) Inventors: Kiran Patel, Temple Terrace, FL (US); Ashis Sarkar, Temple Terrace, FL (US); Biplab K. Pramanik, Temple Terrace, FL (US); Nicole Connors, Warren, NJ (US); Abhitabh Kushwaha, Temple Terrace, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 739 days.

(21) Appl. No.: 14/562,077

(22) Filed: Dec. 5, 2014

(65) Prior Publication Data
US 2016/0162150 A1   Jun. 9, 2016

(51) Int. Cl.
| G06F 3/0488 | (2013.01) |
| G06F 3/0484 | (2013.01) |
| G06F 3/01   | (2006.01) |
| G06F 21/31  | (2013.01) |
| G06F 3/0354 | (2013.01) |

(52) U.S. Cl.
CPC ............ G06F 3/0488 (2013.01); G06F 3/017 (2013.01); G06F 3/03547 (2013.01); G06F 3/04842 (2013.01); G06F 3/04883 (2013.01); G06F 21/31 (2013.01); *G06F 2203/0381* (2013.01); *G06F 2203/04806* (2013.01)

(58) Field of Classification Search
CPC .......................... G06F 3/0488; G06F 3/04842
See application file for complete search history.

(56) References Cited

U.S. PATENT DOCUMENTS

| 5,499,334 A * | 3/1996 | Staab ............... G06F 9/44505 715/778 |
| 5,781,179 A * | 7/1998 | Nakajima ............. G06F 3/038 345/157 |
| 5,841,435 A * | 11/1998 | Dauerer ............... G06F 3/0481 715/764 |
| 8,266,550 B1 * | 9/2012 | Cleron ................ G06F 1/1633 345/173 |
| 8,769,431 B1 * | 7/2014 | Prasad .................. G06F 3/048 715/764 |
| 10,048,845 B2 * | 8/2018 | Yamada ................ G06F 3/041 |
| 2008/0034317 A1 * | 2/2008 | Fard ..................... G06F 3/0481 715/781 |
| 2008/0059893 A1 * | 3/2008 | Byrne ................... G06F 3/0481 715/757 |
| 2008/0211766 A1 * | 9/2008 | Westerman ............ G06F 3/038 345/156 |
| 2010/0088634 A1 * | 4/2010 | Tsuruta ................. G06F 3/0488 715/800 |
| 2010/0321312 A1 * | 12/2010 | Han ..................... G06F 1/1694 345/173 |

(Continued)

FOREIGN PATENT DOCUMENTS

CN       104281405 A * 1/2015 ............ G06F 3/016

*Primary Examiner* — Ryan Barrett

(57) ABSTRACT

Mobile phone application graphically shrinks a display in response to a flick down in right or left diagonal direction, thereby enabling easier operation with a single hand. Soft keys in a menu bar are provided at the bottom of the display conveniently to facilitate single hand use.

20 Claims, 9 Drawing Sheets

(56) References Cited

U.S. PATENT DOCUMENTS

| | | | | |
|---|---|---|---|---|
| 2011/0078624 | A1* | 3/2011 | Missig | G06F 3/04883 715/802 |
| 2011/0167391 | A1* | 7/2011 | Momeyer | G06F 1/1684 715/863 |
| 2011/0313768 | A1* | 12/2011 | Klein | G06F 3/017 704/251 |
| 2012/0084691 | A1* | 4/2012 | Yun | H04M 1/72519 715/769 |
| 2012/0130712 | A1* | 5/2012 | Shin | G06F 3/167 704/231 |
| 2013/0027296 | A1* | 1/2013 | Klein | G06F 3/017 345/156 |
| 2013/0063446 | A1* | 3/2013 | Lau | G06F 8/38 345/473 |
| 2013/0076780 | A1* | 3/2013 | Reeves | G06F 3/1438 345/619 |
| 2013/0139109 | A1* | 5/2013 | Kim | G06F 3/04883 715/835 |
| 2013/0188081 | A1* | 7/2013 | Kulas | G06F 3/041 348/333.01 |
| 2013/0225236 | A1* | 8/2013 | Lee | G06F 17/30265 455/556.1 |
| 2013/0229367 | A1* | 9/2013 | Pinch | G06F 21/36 345/173 |
| 2013/0290887 | A1* | 10/2013 | Sun | G06F 3/0482 715/769 |
| 2014/0006033 | A1* | 1/2014 | Jung | G10L 15/22 704/275 |
| 2014/0109010 | A1* | 4/2014 | Casey | G06F 21/31 715/835 |
| 2014/0109019 | A1* | 4/2014 | Rana | G06F 3/033 715/863 |
| 2014/0188989 | A1* | 7/2014 | Stekkelpak | H04L 67/02 709/204 |
| 2014/0268054 | A1* | 9/2014 | Olsson | G06K 9/00604 351/209 |
| 2014/0282070 | A1* | 9/2014 | Jeon | G06F 3/04842 715/748 |
| 2014/0289642 | A1* | 9/2014 | Prasad | G06F 3/048 715/745 |
| 2014/0351724 | A1* | 11/2014 | Kim | G06F 3/04883 715/765 |
| 2014/0351761 | A1* | 11/2014 | Bae | G06F 3/04817 715/835 |
| 2014/0356843 | A1* | 12/2014 | Yang | G09B 5/00 434/362 |
| 2014/0380185 | A1* | 12/2014 | Kulas | G06F 3/041 715/745 |
| 2015/0058796 | A1* | 2/2015 | Thakur | G06F 3/04883 715/800 |
| 2015/0067589 | A1* | 3/2015 | Xiao | G06F 3/0484 715/800 |
| 2015/0084885 | A1* | 3/2015 | Kawamoto | G06F 3/0482 345/173 |
| 2015/0089440 | A1* | 3/2015 | Choi | G06F 3/0485 715/784 |
| 2015/0205507 | A1* | 7/2015 | Chen | G06F 3/04883 715/800 |
| 2015/0234581 | A1* | 8/2015 | Terrero | G06F 3/04847 715/863 |
| 2015/0331594 | A1* | 11/2015 | Terada | G06F 3/04845 715/801 |
| 2015/0339018 | A1* | 11/2015 | Moon | G06F 3/0484 715/765 |
| 2016/0092047 | A1* | 3/2016 | Yoon | G06F 3/0482 715/798 |
| 2016/0092074 | A1* | 3/2016 | Raux | G06F 3/04842 715/781 |
| 2016/0110056 | A1* | 4/2016 | Hong | G06F 3/04812 715/768 |
| 2016/0147882 | A1* | 5/2016 | Li | G06F 3/017 707/769 |
| 2016/0162149 | A1* | 6/2016 | Lee | G06F 1/1694 715/835 |
| 2016/0291857 | A1* | 10/2016 | Park | G06F 3/0486 |

* cited by examiner

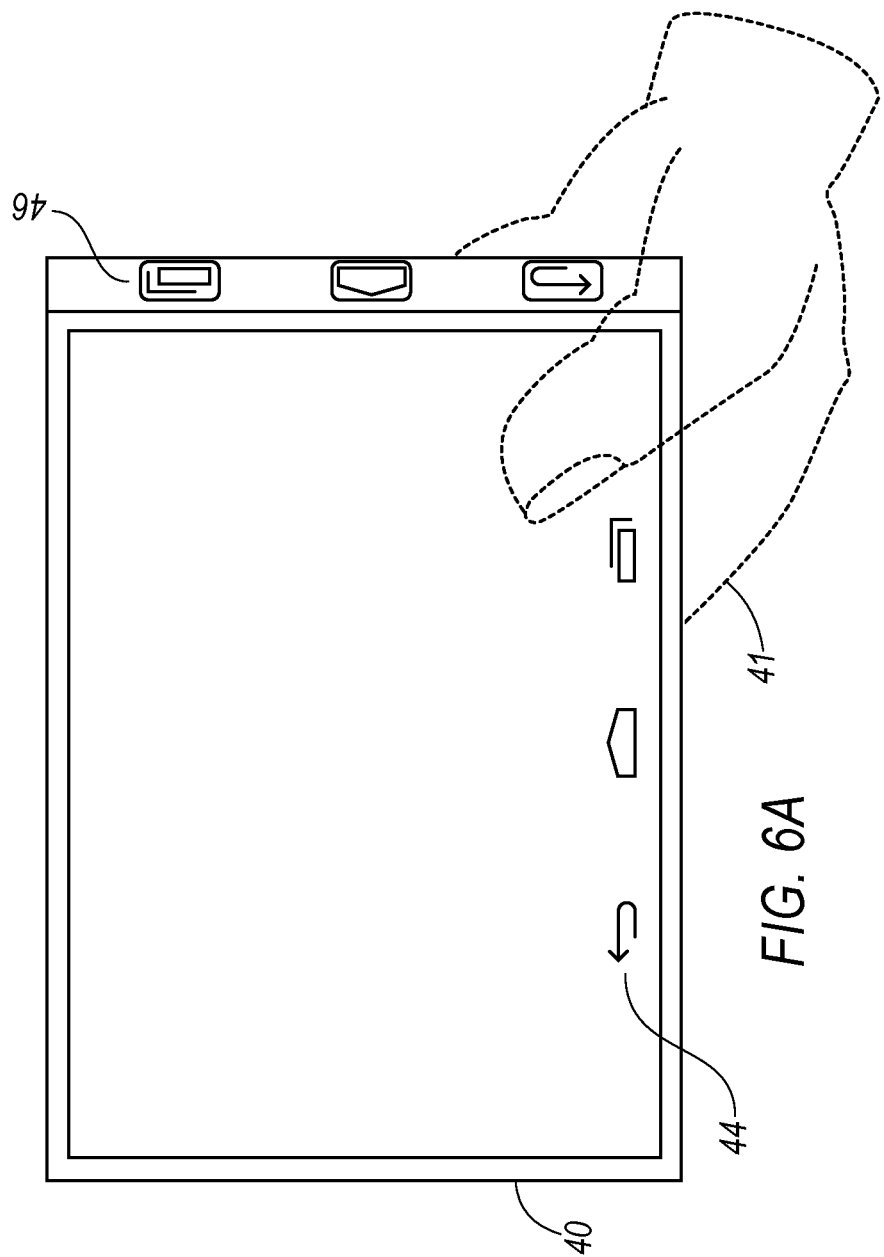

US 10,444,977 B2

CELLPHONE MANAGER

BACKGROUND

As mobile communication devices, such as cellphone, tablets, and other wireless communication products, are provided with larger, or in some cases smaller, graphical user touch displays, there is increasingly a need to facilitate user interaction manually and automatically, e.g., so that a user may hold and control such larger or smaller device comfortably with one hand, and do something different (e.g., hold a cup of coffee) safely with another hand.

BRIEF DESCRIPTION OF THE DRAWINGS

FIG. 5A illustrates an approach where the soft buttons disappear when they would otherwise be closely adjacent to corresponding hard buttons while

FIG. 6A illustrates an approach where the soft buttons are maintained in a full screen mode even if there are corresponding hard buttons when the orientation of the mobile device is such that the hard buttons might otherwise be difficult to access with a single hand while

DETAILED DESCRIPTION

Generally a mobile, portable, wireless, or other network-accessible computing device is configured for executing one or more software application that runs on a processor of the computing device to provide automated operations to display by the processor a first screen area on the computing device, detect by the processor single-hand touch input by the user on the computing device, and display by the processor according to such one or more software applications a second screen area automatically on the computing device in response to the detected user touch input, such that the second screen area includes a graphic shrink, enlarge or other graphical modification of the first screen area. The user single-hand touch input may be a diagonally rightward, leftward, or other pre-defined single-hand finger flick touch by the user.

Also, the user single-hand touch input may correspond with user audio input provided simultaneously with detected touch input, such that audio and touch inputs cause the processor automatically to display graphic shrink or enlarge modification. Furthermore, user single-hand touch input may correspond with user shaking motion of the computer device provided simultaneously with detected touch input, such that shaking motion and touch inputs cause the processor automatically to display the graphic shrink or enlarge modification. Moreover, user single-hand touch input may be detected by the processor on a non-display surface of the computing device. In addition, user single-hand touch input may be configurably detected by the processor according to a secure authentication or user signature. For example, automatic detection by the processor of at least one authentication text, symbolic, audio, or gesture input, as well as user signature or unique input alpha/numeric code may be processed in real-time, optionally in a manner that is user-configurable or otherwise personalizable.

Figure 1:
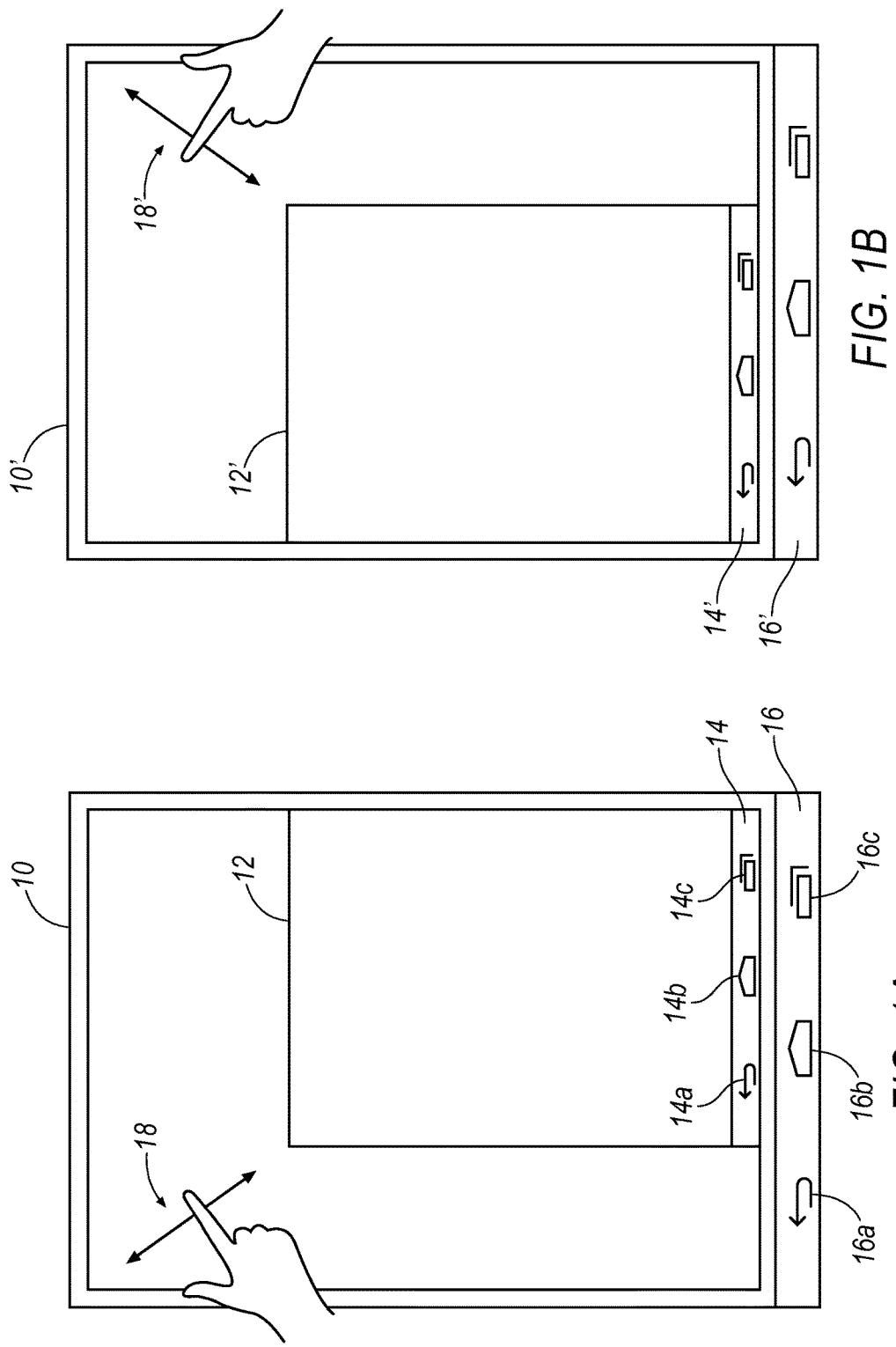
FIGS. 1A and 1B illustrate a pair of exemplary display screens of a mobile device configured to implement one or more aspect of a cellphone manager system and method as described herein.

FIGS. 1A and 1B illustrate a pair of exemplary display screens 10, 10' of a mobile device 20 configured by a processor 24 to implement one or more aspect of a manager system and method as described herein. Exemplary mobile devices 20 may include, without limitation, a mobile device, cellular phone, a smart-phone, a super-phone, a tablet computer, a next generation portable device, a handheld computer, a secure voice communication equipment, networking hardware, or some other computing system and/or device having a touch screen interface display of the type discussed herein.

As shown, both FIGS. 1A and 1B illustrate relatively larger display screens 10, 10' (e.g., shown in "full screen" mode) compared correspondingly to relatively smaller display screens 12, 12' that represent less than the total surface area of a full screen mode. Such relatively larger and smaller display screens 10, 10', 12, 12' each respectively may display various correspondingly larger and smaller menu selection hard buttons 16, 16' and soft buttons 14, 14', respectively along the bottom edge of each such display screens 10, 10', 12, 12'; although it is contemplated optionally that such menu selection soft buttons 14, 14', may be displayed along the top or side edges as well. Such buttons may be configurable or otherwise personalizable. Hard buttons 16 and 16', typically being mechanical in nature, may include such things as a feedback mechanism in the form of a tactile reactive surface. Such a surface may include a physical key that is biased into a non-active orientation. A biasing device such as a spring may be disposed between the tactile reactive surface of the key and a base surface. When key 16 or 16' is physically depressed, it may temporarily move from its non-active orientation to an active orientation overcoming the biasing force of the spring to send a signal, the key returning to its non-active orientation by way of the biasing force, when no longer physically depressed. While also providing feedback, soft buttons 14, 14' may rely on other mechanisms such as sound in place of a force based mechanism to let a user know when a key has been activated.

In one exemplary approach, soft buttons 14, 14' are software-implemented graphically relatively smaller replicas of actual physical hard buttons 16, 16' of the mobile device 20, such that soft buttons 14, 14' are generated automatically by processor 24 when larger display 10, 10' is invoked by the user to shrink the display so that it corresponds to the illustrated smaller display 12, 12'. Both soft and hard buttons 14, 14', 16, 16' may functionally respond in an equivalent manner as input keys to user selection. For example, as shown in FIG. 1A, hard button 16*a* corresponds to soft button 14*a*, hard button 16*b* corresponds to soft button 14*b*, and hard button 16*c* corresponds to soft button 14*c*. While three buttons 14, 14', 16, 16' are illustrated, the number of buttons may be increased or decreased.

An advantage of such an approach is that the functionality that is available by way of hard buttons 16 and 16' when using display screens 10 or 10', respectively, remain available when the screen size is reduced to that shown with respect to display screens 12 or 12'. However, rather than having to utilize hard buttons 16 or 16', which may be hard to reach, the corresponding soft buttons 14 or 14' with the same functionality may be easily reached and manipulated (e.g., with one hand) since they are associated with the smaller screen size. In one exemplary approach, the relative location of each of keys 16 or 16' in relation to screen 10 or 10' is proportionally matched with respect to soft buttons 14 or 14' in relation to the smaller screen size 12 or 12'. Thus, as illustrated, at least one hard button 16 or 16' is at a fixed location in relation to the first screen area represented by either display screen 10 or display screen 10' and at least one soft button 14 or 14' at a fixed location in relation to the second screen area represented by either display screen 12 or display screen 12'. The fixed location of the at least one hard button 16 or 16' in relation to the first screen area may be proportionally matched by the at least one soft button 14 or 14' in relation to the second screen area.

Furthermore, FIGS. 1A and 1B illustrate respectively user single touch input flick or finger drag movement diagonally upward or downward, such that in FIG. 1A, for example, a right diagonal downward user touch flick movement automatically causes larger display screen 10 to shrink graphically to corresponding smaller display screen 12, and in FIG. 1B, for example, a left diagonal downward user touch flick movement automatically causes larger display screen 10' to shrink graphically to corresponding smaller display screen 12'. Such exemplary display screens 10, 10', 12, 12' illustrated in FIGS. 1A and 1B are not intended to be limiting. Indeed, additional or alternative display screens, components and/or implementations may be used.

Figure 2:
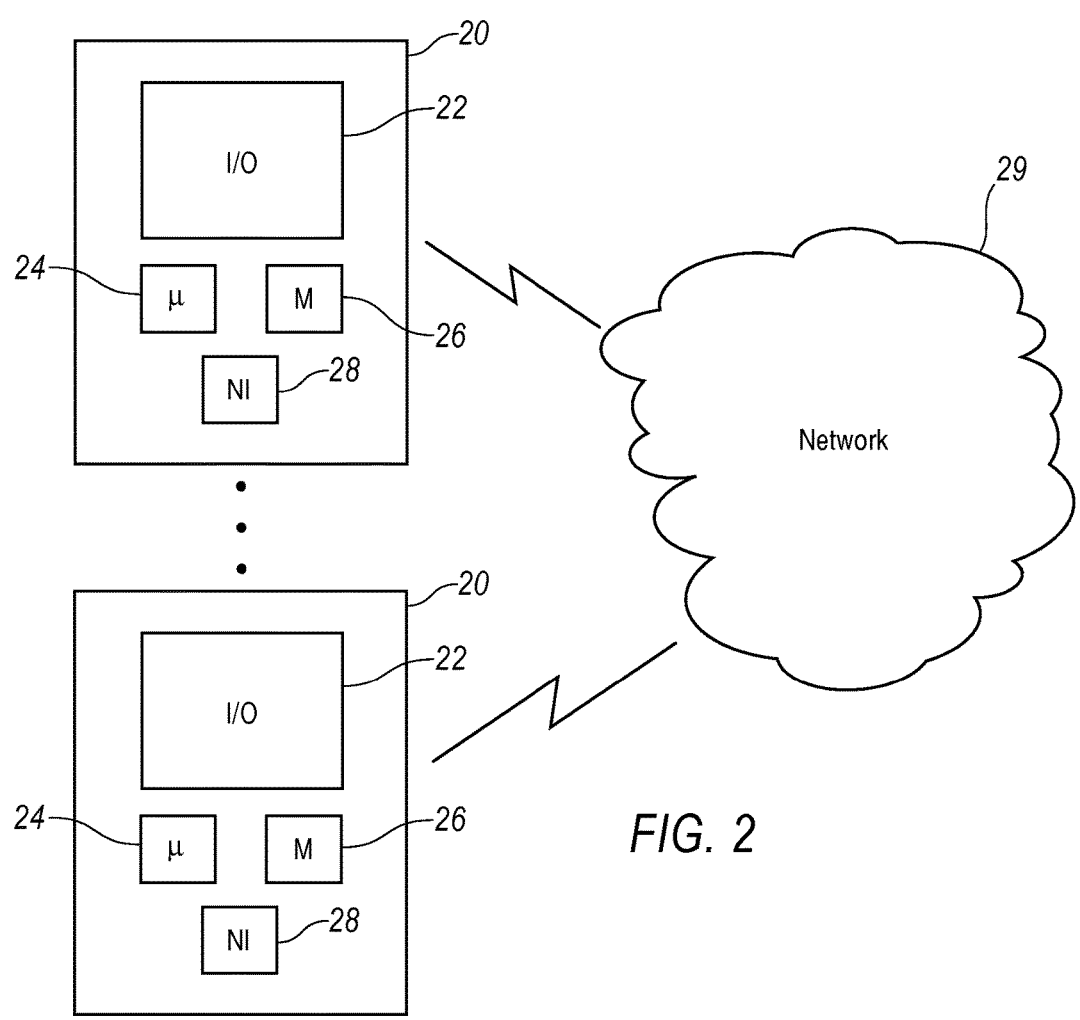
FIG. 2 illustrates an exemplary wireless telecommunication system configured to operate with various mobile devices to implement one or more aspect of a cellphone manager system and method as described herein.

FIG. 2 illustrates an exemplary wireless telecommunication system simplified block diagram configured to operate with various mobile or other communication devices 20 coupled wirelessly or wired to one or more digital communication networks 29 for audio, video, text, or other media telecommunication to implement one or more aspect of a cellphone manager system and method as described herein. Generally device 20 includes a user touch-activatable or otherwise sensitive graphic display screen for electronic input/output (I/O) 22 for enabling user single-hand entry manipulation, a processor 24 that executes one or more applications such as a cellphone manager system or method contemplated herein, a memory 26 for storing various applications and data accessible and executable by processor 24, and a network interface 28 that enables wireless or wired communication between device 20 and network 29 as well as other network devices coupled thereto. Device 20 may take many different forms and include multiple and/or alternate components and facilities. While an exemplary device 20 is shown in FIG. 20, the exemplary components illustrated in FIG. 2 are not intended to be limiting. Indeed, additional or alternative components and/or implementations may be used.

Figure 3:
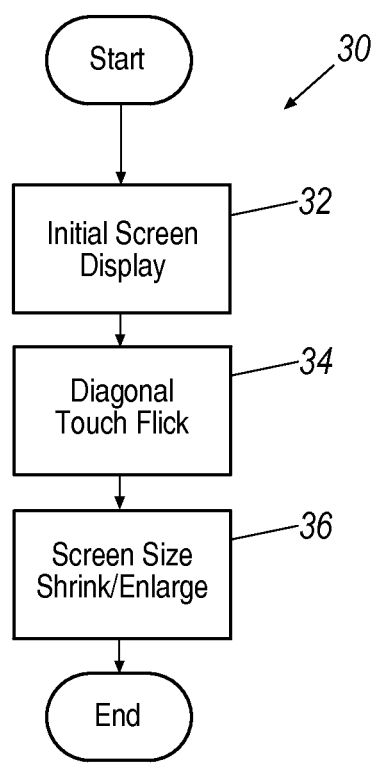
FIG. 3 illustrates an exemplary flow chart of general operational steps to operate one or more mobile device configured to implement one or more aspect of a cellphone manager system and method as described herein.

FIG. 3 illustrates an exemplary flow chart of general operational steps 32, 34, 36 to operate one or more mobile device 20 configured to implement one or more aspect of a large cellphone manager system and method as described herein. In particular, one or more applications may be stored in memory 26 or otherwise accessible from other network-accessible device or storage via network 29 to implement automatically a cellphone manager system and method, for example, computer software program or other instructions that enable processor 24 to cause an initial screen display to be generated 32 graphically via I/O element 22, as shown via exemplary display of FIGS. 1A and 1B. Moreover, the cellphone manager system and method executes such computer software program or other instruction to enable processor 24 to detect 34 one or more user touch input on display screen I/O 22 of device 20. It is contemplated that such detection automatically facilitates user single-hand touch input including predefined touch patterns, such as a diagonally rightward or leftward upward or downward finger flick touch 18, 18' by the user on display screen I/O 22. Accordingly, the cellphone manager system and method executes such computer software program or other instruction to enable processor 24 to display another screen area 12, 12' automatically on device 20 in response to such detected user touch input 18, 18', whereupon such other screen area 12, 12' represents a smaller shrink or larger enlargement that respectively modifies the initial screen area 10, 10', and such display screen input flicking action may conveniently enable single-hand automatic resizing of the working screen area 12, 12' to toggle conveniently between larger 10, 10' and smaller 12,12' display options.

Alternatively the cellphone manager system and method may be embodied not just as computer software program or other instructions executable by processor 24, but also as hardware or firmware, or combinations of software, hardware and/or firmware, as one or multiple functional modules.

Optionally, it is contemplated that the user single-hand touch input may correspond with user audio input provided simultaneously with detected touch input, such that audio and touch inputs cause the processor automatically to display graphic shrink or enlarge modification. Furthermore, user single-hand touch input may correspond with user shaking motion of the computer device provided simultaneously with detected touch input, such that shaking motion and touch inputs cause the processor automatically to display the graphic shrink or enlarge modification. Moreover, user single-hand touch input may be detected by the processor on a non-display surface of the computing device. In addition, user single-hand touch input may be configurably detected by the processor according to a secure authentication or user signature. For example, automatic detection by the processor of at least one authentication text, symbolic, audio, or gesture input, as well as user signature or unique input alpha/numeric code may be processed in real-time, optionally in a manner that is user-configurable or otherwise personalizable.

Figure 4A:
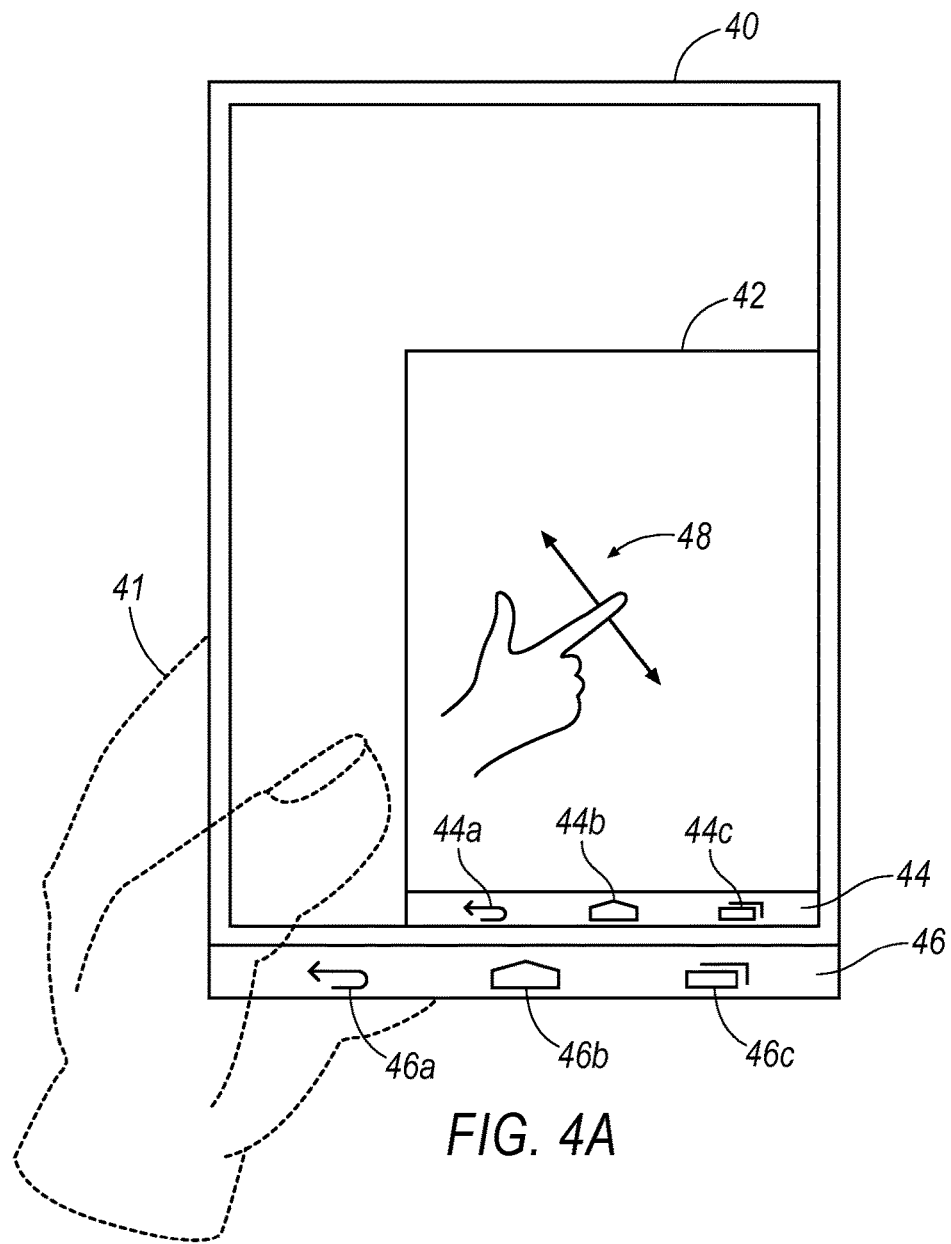
FIGS. 4A and 4B illustrate a pair of optional display screens of a mobile device configured to implement one or more aspect of a cellphone manager system and method as described herein.
Figure 4B:
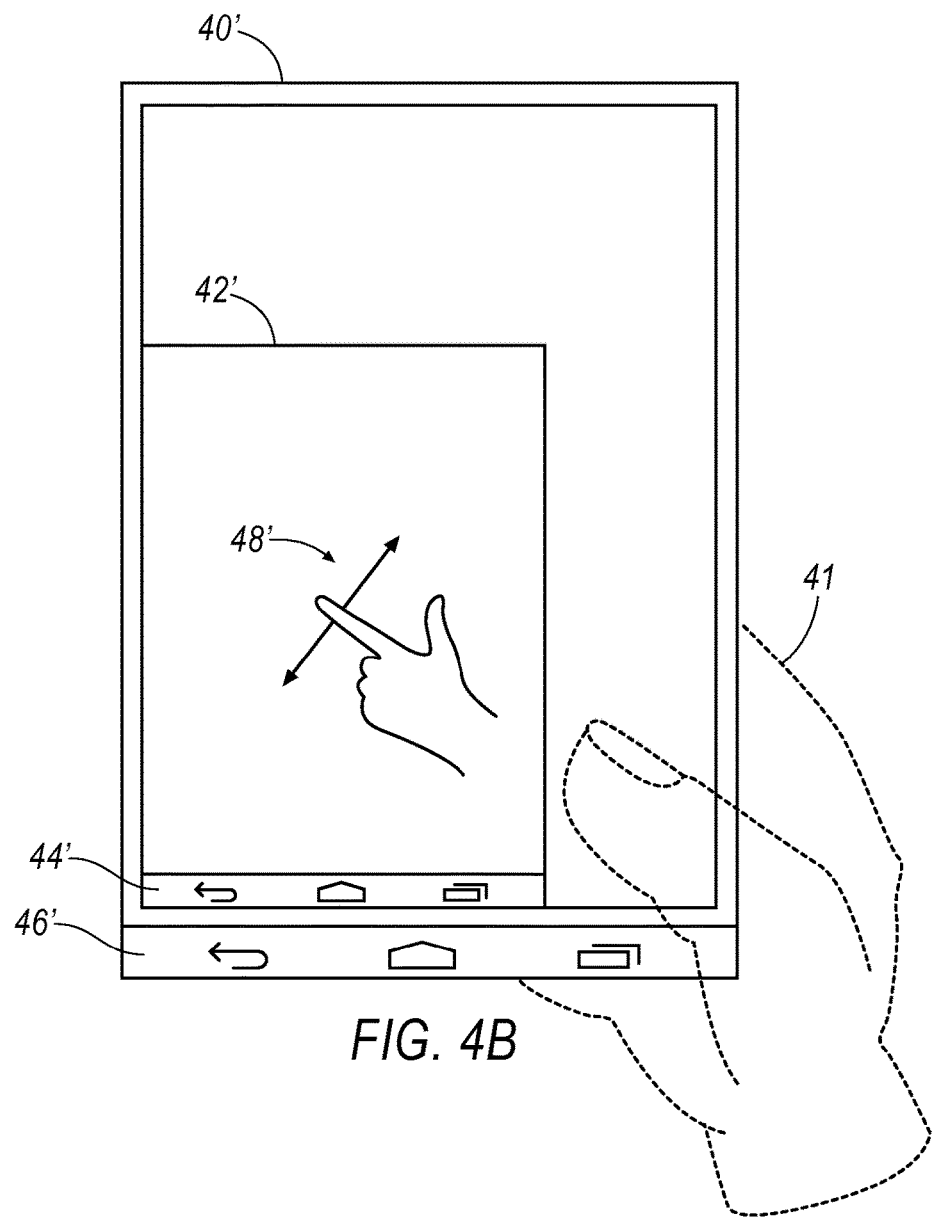

FIGS. 4A and 4B illustrate a pair of optional exemplary display screens 40, 40' of the same or other mobile device 20 configured by processor 24 to implement one or more aspect of a cellphone manager system and method as described herein. As shown, both FIGS. 4A and 4B illustrate relatively larger display screens 40, 40' compared correspondingly to relatively smaller display screens 42, 42'. Such relatively larger and smaller display screens 40, 40', 42, 42' each respectively may display various correspondingly larger and smaller menu selection hard buttons 46, 46' and soft buttons 44, 44', respectively along the bottom edge of each such display screens 40, 40', 42, 42'; although it is contemplated optionally that such menu selection soft buttons 44, 44' may be displayed along the top or side edges as well. Such buttons may be configurable or otherwise personalizable.

In one exemplary approach, soft buttons 44, 44' are software-implemented graphically relatively smaller replicas of actual physical hard buttons 46, 46' of the mobile device 20, such that soft buttons 44, 44' are generated automatically by processor 24 when larger display 40, 40' is invoked by the user to shrink the display so that it corresponds to the illustrated smaller display 42, 42'. Both soft and hard buttons 44, 44', 46, 46' may functionally respond in an equivalent manner as input keys to user selection. For example, as shown in FIG. 4A, hard button 46a corresponds to soft button 44a, hard button 46b corresponds to soft button 44b, and hard button 46c corresponds to soft button 44c. The advantages to having such a relationship between hard buttons 46 or 46' and soft buttons 44 or 44' is the same as discussed above with respect to hard buttons 16 or 16' and soft buttons 14 or 14' and the corresponding discussion above is incorporated herein.

Furthermore, FIGS. 4A and 4B illustrate respectively user single touch input flick or finger drag movement diagonally upward or downward, such that in FIG. 4A, for example, a left diagonal upward user touch flick movement automatically causes smaller display screen 40 to expand graphically to corresponding larger display screen 40, and in FIG. 4B, for example, a right diagonal upward user touch flick movement automatically causes smaller display screen 42' to expand graphically to corresponding larger display screen 40'. Such exemplary display screens 40, 40', 42, 42' illustrated in FIGS. 4A and 4B are not intended to be limiting. Additional or alternative display screens, components and/or implementations may be used.

In addition, soft buttons 14, 14', 44, 44' and hard buttons 16, 16', 46, 46' may be disposed accessibly to enable user finger touch or pinching access to reach proximately along the bottom, top or side edge of smaller display 12, 12', 42, 42' and larger display 10, 10', 40, 40' of mobile device 24, such that single-hand screen display manipulation and finger touch entry are facilitated ergonomically, while simultaneously holding, pinching, gripping, palming or otherwise manually supporting the mobile device 24 with the same hand 41, 41' used to enter user touch screen input.

Thus, the embodiments shown in FIGS. 1A and 1B, as well as 4A and 4B, illustrate particular functionality that automatically uses one or more soft-key equivalent corresponding to one or more hard-key buttons on a given physical display of such corresponding mobile device 20. Hence, this soft-key/hard-key equivalent correspondence facilitates manual and/or automatic user input via a single left or right hand, particularly using a single finger, as shown in such Figures. Additionally, in either or both examples of FIGS. 1A and 1B, as well as 4A and 4B, it is contemplated herein optionally that such shown single finger and thumb (or other finger or pointing device) may be used in a simultaneous touch, inward pinching or outward un-pinching manner to provide user input or selection manually or automatically. Accordingly, in such embodiments, the user may conveniently still hold or otherwise manually support, control or otherwise secure below and/or behind the mobile device 20 with the same hand shown that includes the single finger (and thumb or other finger or pointing device) that is used to touch the touch screen as user input.

Figure 5A:
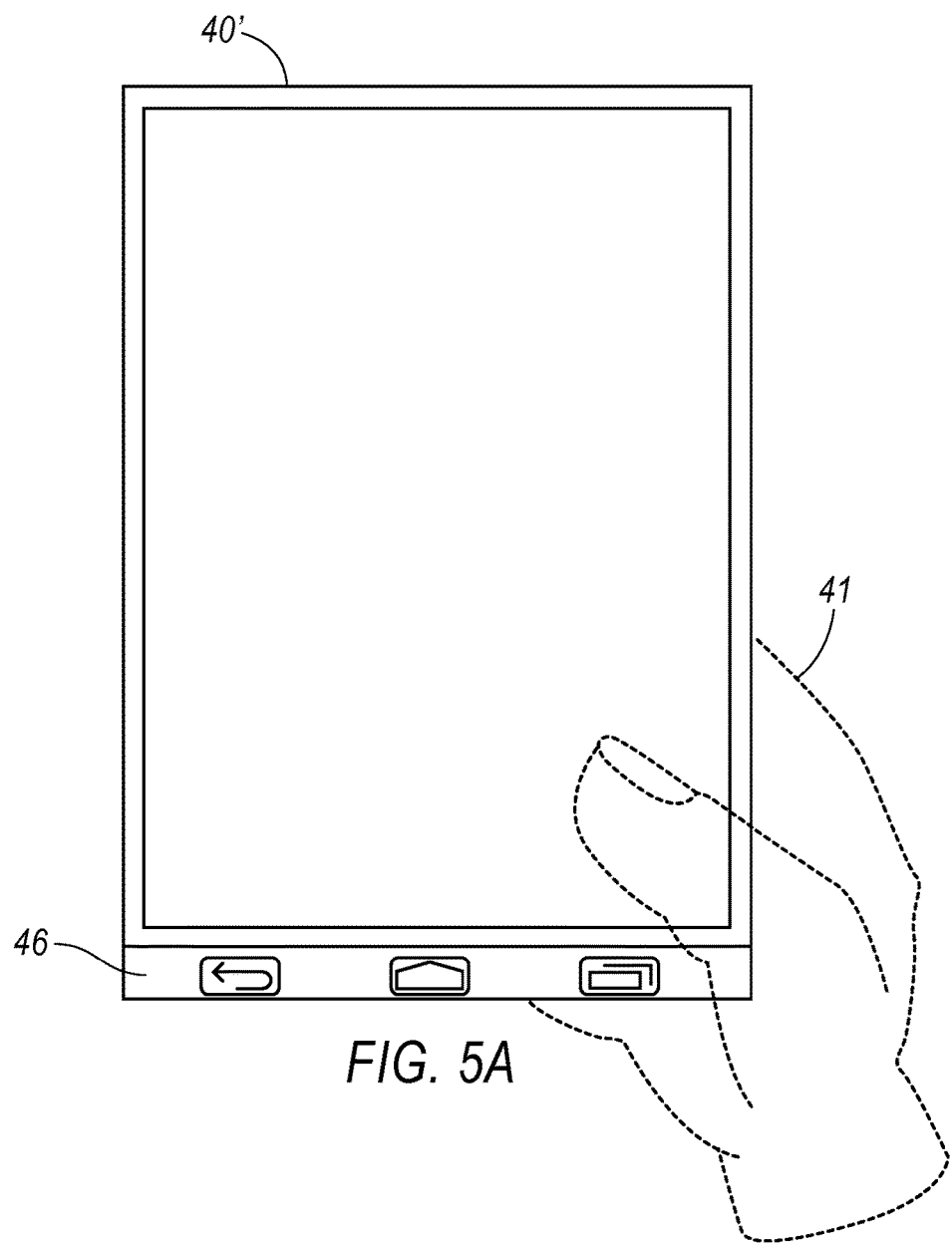
Figure 5B:
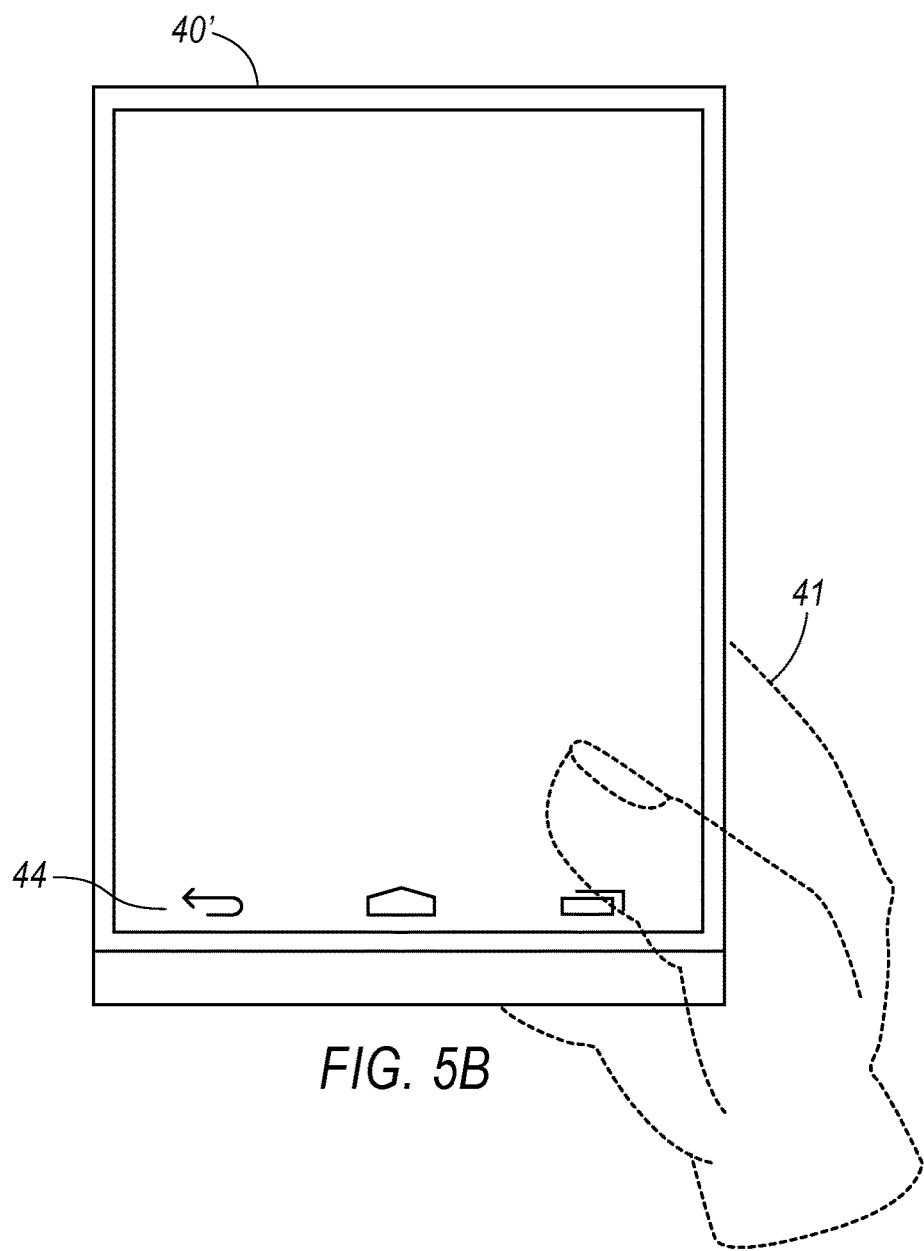
FIG. 5B illustrates an approach where the soft buttons are maintained even in a full screen mode when there are no corresponding hard buttons closely adjacent to the soft buttons.

FIG. 5A illustrates an approach where the soft buttons 44 may disappear when they would otherwise be closely adjacent to corresponding hard buttons 46 such as in a full screen portrait mode and the hard buttons are disposed along the short edge closest to a hand 41. In such an orientation there may be unwanted redundancy. In contrast, FIG. 5B illustrates an approach where the soft buttons are maintained even in a full screen mode when there are no corresponding hard buttons closely adjacent to the soft buttons. While no hard buttons 46 are shown in FIG. 5B, in an alternative approach, the mobile device of 5A may be re-oriented one-hundred and eighty degrees such that the hard buttons 46 are not readily accessible to a hand 41. In such a situation it would be desirable to utilize soft buttons 44 as shown in FIG. 5B.

FIG. 6A illustrates an approach where again the soft buttons 44 are maintained even in a full screen mode if there are corresponding hard buttons 46 when the orientation of the mobile device is such that the hard buttons might otherwise be difficult to access with a single hand 41. In the illustrated example, the mobile device 20 is shown in a landscape mode where the hard buttons are along the short edge with at least a subset of the hard buttons not as readily accessible. Of note, in some situations it may be desirable to use a combination of soft buttons 44 and hard buttons 36, particularly when a corresponding button is more easily accessible to a hand. For example, in FIG. 6A, the arrow feature of hard button 46 is more readily accessible than the corresponding arrow feature shown for soft button 44. In contrast, it may be easier to access the soft button 44 with a rectangular image as compared to the corresponding button 46 that is not as close to the illustrated thumb of hand 41. Thus, in some situations only a subset of soft buttons 44 may be displayed depending on their relative proximity to a hand 41 as compared to a permanent hard button 46.

Figure 6B:
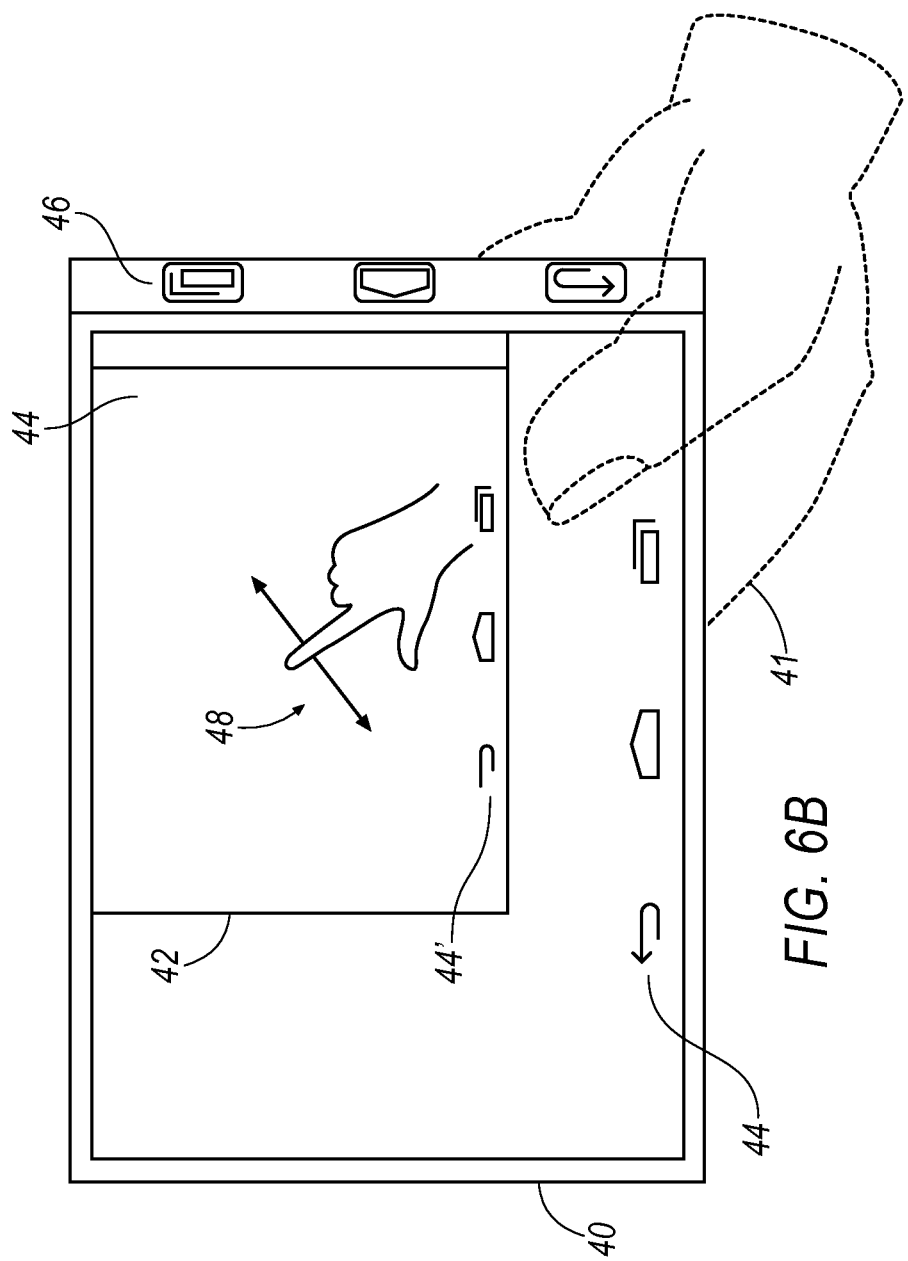
FIG. 6B shows that the soft buttons are maintained even as the device is adjusted to a smaller non-full screen mode.

FIG. 6B shows that the soft buttons may be maintained even as the device is adjusted to a smaller non-full screen mode. In the illustrated example, the size and relative spacing of the soft buttons 44' are changed relative to soft buttons 44 in the original full screen mode.

In general, computing systems and/or devices, such as device 20, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as device 20 generally include computer-executable instructions such as the instructions of the cellphone manager system and method, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as memory 26, may include various kinds of mechanisms for storing, accessing, and retrieving various kinds of data, including a hierarchical database, a set of files in a file system, an application database in a proprietary format, a relational database management system (RD-BMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device configured to execute a software application on a processor of the computing device to provide operations comprising:
   displaying by the processor a first screen area on the computing device in a full screen mode, the first screen area including a plurality of soft buttons corresponding to and being displayed in a same order as a plurality of hard buttons of the computing device;
   detecting by the processor a user single-hand touch input on the computing device in a diagonally rightward or leftward direction; and
   displaying by the processor according to the software application a second screen area in a non-full screen mode automatically on the computing device in response to the detected user single-hand touch input and in the direction of the detected user single-hand touch input, such that the second screen area comprises a graphic shrink or enlarge modification of the first screen area, the second screen area including a plurality of soft buttons corresponding to and being displayed in the same order as the plurality of hard buttons of the computing device;
   wherein in the non-full screen mode, the plurality of soft buttons on the first screen area is maintained;
   wherein the graphic shrink is only in a downward direction when the computing device is in a portrait mode, and only in an upward direction when the computing device is in a landscape mode.

2. The computing device of claim 1, wherein the user single-hand touch input comprises a finger flick touch by the user.

3. The computing device of claim 1, wherein the user single-hand touch input corresponds with a user audio input provided simultaneously with the detected touch input, such that both the audio and touch inputs cause the processor automatically to display the graphic shrink or enlarge modification.

4. The computing device of claim 1, wherein the user single-hand touch input corresponds with a user shaking motion provided simultaneously with the detected user single-hand touch input, such that both the shaking motion and user single-hand touch inputs cause the processor automatically to display the graphic shrink or enlarge modification.

5. The computing device of claim 1, wherein the user single-hand touch input is detected by the processor on a non-display surface of the computing device.

6. The computing device of claim 1, wherein the user single-hand touch input is configurably detected by the processor according to a secure authentication or user signature.

7. The computing device of claim 1, wherein a size and relative spacing of the soft buttons on the second screen area are changed from the size and relative spacing of the soft buttons on the first screen area.

8. A non-transitory computer-readable medium tangibly embodying computer-executable instructions of a software program, the software program being executable by a processor of a computing device to provide operations comprising:
   displaying by the processor a first screen area on the computing device in a full screen mode, the first screen area including a plurality of soft buttons corresponding to and being displayed in a same order as a plurality of hard buttons of the computing device;
   detecting by the processor a user single-hand touch input on the computing device in a diagonally rightward or leftward direction; and
   displaying by the processor according to the software program a second screen area in a non-full screen mode automatically on the computing device in response to the detected user single-hand touch input and in the direction of the detected user single-hand touch input, such that the second screen area comprises a graphic shrink or enlarge modification of the first screen area, the second screen area including a plurality of soft buttons corresponding to and being displayed in the same order as the plurality of hard buttons of the computing device;
   wherein in the non-full screen mode, the plurality of soft buttons on the first screen area is maintained;
   wherein the graphic shrink is only in a downward direction when the computing device is in a portrait mode, and only in an upward direction when the computing device is in a landscape mode.

9. The medium of claim 8, wherein the user single-hand touch input corresponds with a user audio input provided simultaneously with the detected touch input, such that both the audio and touch inputs cause the processor automatically to display the graphic shrink or enlarge modification.

10. The medium of claim 8, wherein the user single-hand touch input corresponds with a user shaking motion provided simultaneously with the detected user single-hand touch input, such that both the shaking motion and user single-hand touch inputs cause the processor automatically to display the graphic shrink or enlarge modification.

11. The medium of claim 8, wherein the user single-hand touch input is detected by the processor on a non-display surface of the computing device.

12. A method comprising:
   displaying by a processor a first screen area on a computing device in a full screen mode, the first screen area including a plurality of soft buttons corresponding to and being displayed in a same order as a plurality of hard buttons of the computing device;
   detecting by the processor a user single-hand touch input on the computing device in a diagonally rightward or leftward direction; and
   displaying by the processor according to a software application a second screen area in a non-full screen mode automatically on the computing device in response to the detected user single-hand touch input and in the direction of the detected user single-hand touch input, such that the second screen area comprises a graphic shrink or enlarge modification of the first screen area, the second screen area including a plurality of soft buttons corresponding to and being displayed in the same order as the plurality of hard buttons of the computing device;
   wherein in the non-full screen mode, the plurality of soft buttons on the first screen area is maintained;
   wherein the graphic shrink is only in a downward direction when the computing device is in a portrait mode, and only in an upward direction when the computing device is in a landscape mode.

13. The method of claim 12, wherein the user single-hand touch input comprises a finger flick touch by the user.

14. The method of claim 12, wherein the user single-hand touch input corresponds with a user audio input provided simultaneously with the detected user single-hand touch input, such that both the audio and user single-hand touch inputs cause the processor automatically to display the graphic shrink or enlarge modification.

15. The method of claim 12, wherein the user single-hand touch input corresponds with a user shaking motion provided simultaneously with the detected touch input, such that both the shaking motion and touch inputs cause the processor automatically to display the graphic shrink or enlarge modification.

16. The method of claim 12, wherein the user single-hand touch input is detected by the processor on a non-display surface of the computing device.

17. The method of claim 12, wherein the user single-hand touch input is configurably detected by the processor according to a secure authentication or user signature.

18. The method of claim 12, wherein the processor detects one of the plurality of soft buttons that corresponds to one of the plurality of hard buttons upon a user touch with at least one finger on the one of the plurality of soft buttons to facilitate single-hand control of the computing device.

19. The method of claim 18, further comprising displaying the one plurality of soft buttons on at least the first screen area when the mobile device is in a landscape mode.

20. The method of claim 12, wherein single-hand control of the computing device is enabled by a same hand that comprises a finger and a thumb that pinches or un-pinches to provide user input.

* * * * *